March 22, 1932. A. KAROLUS 1,850,629

MIRROR WHEEL FOR TELEVISION SYSTEMS

Filed April 19, 1930

INVENTOR
AUGUST KAROLUS
BY
ATTORNEY

Patented Mar. 22, 1932

1,850,629

UNITED STATES PATENT OFFICE

AUGUST KAROLUS, OF LEIPZIG, GERMANY, ASSIGNOR TO RADIO CORPORATION OF AMERICA, A CORPORATION OF DELAWARE

MIRROR WHEEL FOR TELEVISION SYSTEMS

Application filed April 19, 1930, Serial No. 445,540, and in Germany May 1, 1929.

The present invention relates to television systems, and, in particular, to the scanning devices used therein. According to the present development in the television art, the so-called mirror or reflector wheel forms an essential part of many of the modern television installations. Such a mirror wheel consists of a polygonal prism revoluble about its axis and whose shell or circumference carries mirrors or reflectors of small size. As the mirror polygon thus constructed is rotated, all of the mirrors are consecutively caused to pass through a relatively small zone where the pencil of light rays falling upon a given mirror is reflected on to the picture surface which it passes or scans along a line in accordance with the motion of the mirror. If all of the mirrors are positioned exactly in the plane of the wheel shell, then to scan the entire projection surface by the ray pencil a second mirror wheel is required having its shaft or spindle positioned at right angles to the former in order to collect the scanning pencil moving along or in the direction of one dimension of the picture projection surface and to impart to it also motion in the direction of the other dimension. However, a construction of mirror wheel which is particularly advantageous is one in which the constituent mirrors do not fall exactly in the plane of the prism shell, or, in other words, in which all of the mirrors are not positioned parallel to the axis of rotation, but present different angles of inclination of small size in relation to the axis of rotation. As a result, the lines along which the light ray pencils reflected from different mirrors of a mirror wheel travel over or scan the projection surface of the picture consecutively will not coincide, so that in this form of construction only one mirror wheel will be required for insuring complete scanning and exploration of the projection surface in a line for line manner.

Since the corresponding points of the picture projection surface at the transmitter and the receiver end must be scanned practically simultaneously, care must be taken to provide driving arrangements so arranged that the mirror drum systems of both parts of the televisor equipment will revolve in perfect synchronism. For the drive of the mirror wheel recourse is usually had to synchronous motors which are maintained in perfect synchronism by the aid of tuning forks or other suitable constant-frequency means.

A drive of this kind usually comprises a D. C. shunt-wound motor which supplies the major part of the drive energy, and a synchronous motor which is subject to tuning fork or other constant frequency. With these systems, the synchronous motor control furnishes only the energy required to insure absolute synchronous rotation.

From the above, it is, of course, apparent that my invention has as one of its primary objects that of providing simpler and more efficient means for driving the television scanning element. Other objects will suggest themselves and become apparent from a reading of the following specification and claims in connection with the accompanying drawings, indicating several of the many forms which the invention may assume.

By the drawings, Fig. 1 represents the usual D. C. motor drive and synchronous motor control;

Figure 1:
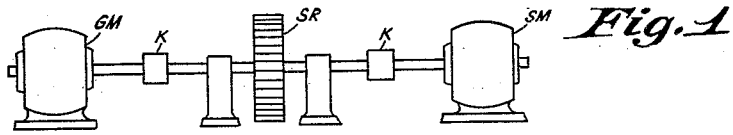

Now, by referring to the drawings and first to Fig. 1, illustrating a drive of this kind as known in the prior art, SR denotes the mirror wheel which is in mechanical coupling relationship through a clutches KK with a D. C. motor GM and a synchronous motor SM. Under certain circumstances, the D. C. motor may be dispensed with so that the entire drive is taken over by the synchronous motor, it having to be noted that the driving energy required by such a mirror-wheel mechanism is ordinarily but small, and, in fact, apart from the electro-magnetic losses of the driving motor, it is, in the main, due to windage and bearing friction of the revolving parts. It is important to reduce the required driving energy to as low a measure as feasible.

According to the present invention, this is made feasible by the aid of an improved form of construction in which the mirror wheel and its drive mechanism is united to form a single apparatus unit in such a way that the stator member of the electric drive is disposed inside the mirror wheel, while the inner wall of the mirror drum surounding said stator member is so designed as to act as a rotor.

By the adoption of this form of construction, the size of the revolving masses and surfaces resulting in windage as well as the number of supports and bearings is minimized; and, also, the space requirement of the entire outfit is reduced.

In the majority of cases when practicing this scheme, it will be sufficient to provide merely a synchronous motor for the drive. The mechanical end of the object of this invention and an embodiment thereof is shown in roughly schematic form in the accompanying drawings by Figs. 2 and 2a.

Figure 2:
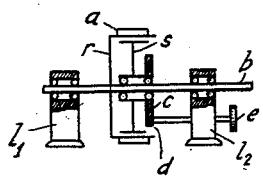
Figs. 2 and 2a represent in a schematic manner the construction according to my present invention, wherein the scanning element is formed as a part of the rotor of the drive mechanism.

In the arrangment illustrated in Fig. 2, the wheel $r$ bearing the mirrors $a$ is fixedly united with the shaft $b$ which is revolubly supported in the bearings $l_1$ and $l_2$, most preferably bearings of the ball or roller type. The inner wall is designed to act as a rotor member forming part of an electromagnetic drive, and inside this rotor is mounted the stator $s$ being most suitably supported by ball or roller bearings on a shaft $b$, in such a manner that it will not partake of the rotation of the said shaft $b$. In order to insure perfect co-phasal relation between the two drive mechanisms provided at the sending and at the receiving ends, it is necessary that the stator member $s$ should be disposed so as to be capable of adjustment. This may be effected in any desired manner, for example, the gear-wheel rim $c$ mounted at some suitable point of the stator is set through a pinion $d$ in meshing relation therewith and a setting wheel $e$, whereupon it should be adapted to be locked in the desired position.

Figure 2A:
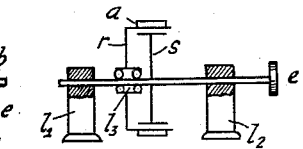

The arrangement shown in Fig. 2a differs from the foregoing essentially only in that here the shaft $b$ is fixedly connected with with the stator $s$ and not with the mirror-wheel $r$ and that it is passed through the hub or boss $l_3$ preferably supported by ball or roller bearings. In this form of construction, the bearings $l_1$ and $l_2$ need not be designed as ball bearings. The device $e$ serving for turning and locking the stator $s$ may here be attached to one of the butt ends of the shaft $b$.

The construction of the electromagnetic part of the motor drive may be of widely different kind. For instance, the stator and the rotor in a way known in the prior art may be provided with teeth gearings comprising the same number of teeth and being placed opposite each other, each tooth, or every other tooth, of one motor member being furnished with a D. C. winding and the other one with an A. C. winding. However, it is preferable to use a type of construction in which, at least in one motor member, the complicated and tedious wrapping of a winding around some of the teeth is avoided, or wherein the motor member has no winding at all. Among the types suited for this purpose may be mentioned here the claw type, the O-type and the phonic wheel.

Figure 3:
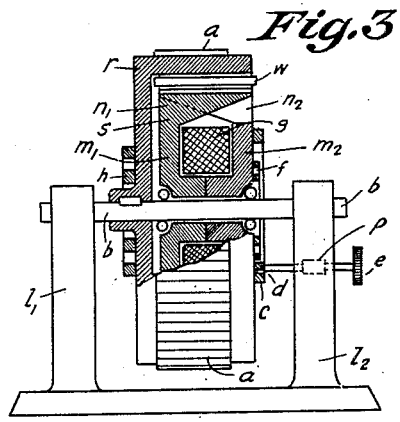
Fig. 3 represents one practical form of the invention schematically shown by Fig. 2.

Now making reference to Fig. 3, which illustrates a side elevation, partly in vertical section, of a synchronous motor of the claw-pole type built into the mirror wheel $r$ according to this invention, the rotor is here furnished with teeth in which the A. C. winding $w$, here supplied through slip rings $h$, is accommodated. The stator consists of two rings laid together, $m1$ and $m2$. The claw poles $n1$ of the ring $m1$ are of one polarity, and the claw poles $n2$ of the ring $m2$ are of the other polarity. The claw poles of one polarity engage the spaces or notches of the claw poles of the other polarity in such a manner that the magnetic flux becomes closed through the rotor teeth. The number of the rotor teeth is equal to the number of the claw poles of the stator. The exciting coil $g$ fed by way of the D. C. slip rings $f$ serves for D. C. excitation of the stator.

Figure 4:
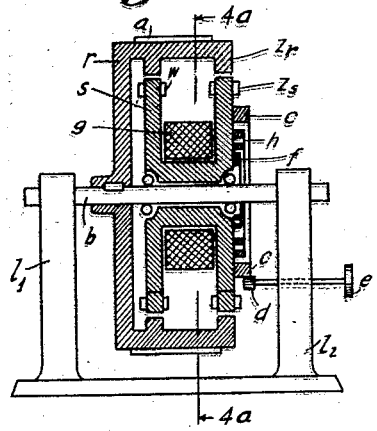
Fig. 4 represents a modification of the form of invention shown by Fig. 3.
Figure 5:
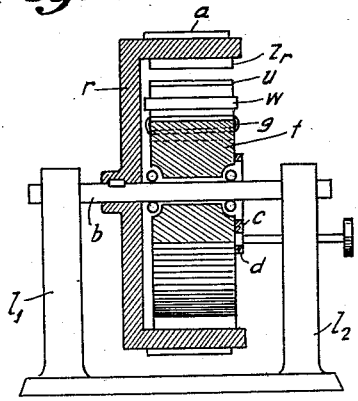
Fig. 5 is a further modification of the arrangement of Fig. 3.

The shaft or axis of the pinion $d$ insuring setting and locking may be supported in a convenient extension $p$ of the bearing $l_2$ or else, as shown in Fig. 4 and Fig. 5, directly in the said bearing.

Figure 4A:
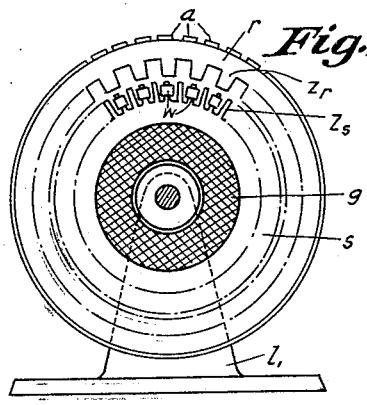
Fig. 4a is a sectional view of the arrangement of Fig. 4, taken on the line 4a—4a thereof.

In the case of the embodiment shown by way of example in Figs. 4 and 4a, the built-in synchronous motor is of what is known as the O-type. The rotor teeth $z_r$ are unwound. The stator $s$ has a D. C. exciting coil $g$ disposed in a way similar to the preceding embodiment and fed by way of the slip rings $f$, and an A. C. winding $w$ fed by way of the slip rings $h$ and disposed on the stator teeth $z_s$.

Figure 5A:
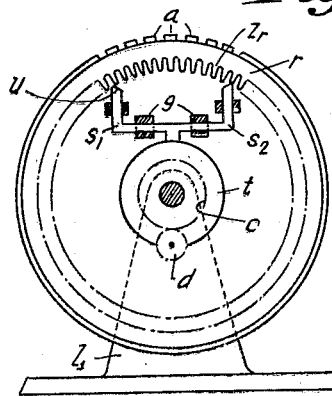
Fig. 5a represents a section of Fig. 5, taken on the line 5a—5a thereof.

In the embodiment shown by way of example in Fig. 5 and Fig. 5a, the drive consists of an application of the principle underlying the so-called phonic wheel. As shown in the drawings the rotor has been furnished with a continuous dentation, though the constituent teeth thereof could also be replaced by a corresponding number of round or square bolts or strips of soft iron disposed along the shell line of the inner cylindrical wall of the drum wheel and separated from one another. The stator here consists of any desired number of electromagnets terminating in points $u$ and secured upon a boss or hub $t$, the latter, if desired, being adjustable by the agency of tooth wheels $c$ and $d$. The number of said electromagnets is governed according to the amount of driving force that is required, indeed, under certain circumstances, the provision of a single electromagnetic pole $u$ may suffice.

In the present example, an electromagnet having two prongs $s1$, $s2$, terminating in points $u$—$u$ is shown. $g$ denotes the D. C. winding and $w$ again the A. C. winding. It is well-known, however, that motor action is producible also by a single winding if a rhythmically pulsating D C. is sent therethrough.

To reduce windage or air resistance in all of the embodiments hereinbefore cited, the gaps between teeth or notches may be filled up by suitable non-magnetic material so that all of the surfaces essentially responsible for windage are thus rendered smooth.

In all of the embodiments shown in Figs. 3 et seq. the mirror wheel $r$ is shown as keyed upon the shaft $b$ in accordance with the mechanical scheme shown by Fig. 2. though it will be understood that in all of these cases recourse could be had also to an arrangement as shown in Fig. 2a.

If a D. C. motor is desired in addition to the synchronous motor, then the former may be mounted inside the mirror-wheel similarly and adjacent to the latter, though, as a general rule, this will be found unnecessary inasmuch as the synchronous motor, because of the small amount of energy that is required, will suffice for the drive. In order that the mechanism may be brought to synchronous speed, an electrical or mechanical device transiently coupled for starting or else a manual drive may be resorted to.

If desired, synchronous start may be secured in well-known manner by a suitably arranged auxiliary winding.

Having now described my invention, what I claim and desire to secure by Letters Patent is the following:

1. An optical apparatus comprising a motor having an internal stator and an external rotor, and an optical analyzing element integral with the outer periphery of said rotor.

2. An optical apparatus comprising a synchronous motor having an internal stator and an external rotor, and an optical analyzing element carried upon the outer periphery of said rotor.

3. An optical apparatus comprising a synchronous motor having an internal stator and an external rotor, and an optical scanning element mounted on the outer periphery of said rotor.

4. An optical apparatus comprising a motor having an internal stator and an external rotor, an optical analyzing element carried upon the outer periphery of said rotor, and means for adjusting the stator of said motor so as to change the phase angle position thereof.

AUGUST KAROLUS.